United States Patent
Krishnamurthy (10) Patent No.: US 9,462,342 B2
(45) Date of Patent: Oct. 4, 2016

(54) SYSTEM AND METHOD FOR RECOMMENDING ON DEMAND MULTIMEDIA CONTENT BASED ON EVENT INFORMATION

(71) Applicant: Althea Systems and Software Private Limited, Bangalore (IN)

(72) Inventor: Kishore Adekhandi Krishnamurthy, Bangalore (IN)

(73) Assignee: SUREWAVES MEDIATECH PRIVATE LIMITED, Bangalore, Karnataka (IN)

( * ) Notice: Subject to any disclaimer, the term of this patent is extended or adjusted under 35 U.S.C. 154(b) by 0 days.

(21) Appl. No.: 14/140,226

(22) Filed: Dec. 24, 2013

(65) Prior Publication Data
US 2014/0208350 A1 Jul. 24, 2014

(30) Foreign Application Priority Data
Jan. 24, 2013 (IN) .............................. 336/CHE/2013

(51) Int. Cl.
| | |
|---|---|
| *H04N 21/466* | (2011.01) |
| *H04N 21/482* | (2011.01) |
| *H04N 21/25* | (2011.01) |
| *G06Q 50/00* | (2012.01) |
| *H04N 21/442* | (2011.01) |
| *H04N 21/472* | (2011.01) |

(52) U.S. Cl.
CPC .......... *H04N 21/4668* (2013.01); *G06Q 50/01* (2013.01); *H04N 21/251* (2013.01); *H04N 21/44222* (2013.01); *H04N 21/466* (2013.01); *H04N 21/4667* (2013.01); *H04N 21/47202* (2013.01); *H04N 21/4826* (2013.01)

(58) Field of Classification Search
CPC ........... H04N 21/251; H04N 21/4826; H04N 21/466; H04N 21/4668
See application file for complete search history.

(56) References Cited

U.S. PATENT DOCUMENTS

| | | | | |
|---|---|---|---|---|
| 2002/0188947 | A1* | 12/2002 | Wang | H04N 5/44543 725/45 |
| 2008/0209325 | A1* | 8/2008 | Suito | G11B 19/025 715/719 |
| 2012/0254917 | A1* | 10/2012 | Burkitt | G06F 17/30817 725/40 |
| 2012/0284738 | A1* | 11/2012 | Narasimhan | H04H 20/38 725/16 |
| 2012/0291070 | A1* | 11/2012 | Feng | H04N 21/234336 725/40 |
| 2012/0296920 | A1* | 11/2012 | Sahni | H04L 67/22 707/749 |

(Continued)

FOREIGN PATENT DOCUMENTS

JP 2012065054 A * 3/2012

*Primary Examiner* — Robert Hance
(74) *Attorney, Agent, or Firm* — Barry Choobin; Patent 360

(57) ABSTRACT

A method for recommending premium on-demand multimedia content based on event information is provided. The method includes (i) obtaining the event information associated with a time period, (ii) mapping the event information with structured metadata associated with a plurality of premium on-demand multimedia content, (iii) generating a recommendation for at least one matching premium on-demand multimedia content based on the event information and a structured metadata associated with the at least one matching premium on-demand multimedia content. The time period includes a current time during which an event is trending. A metadata associated with at least one premium multimedia content corresponds to the event information.

3 Claims, 9 Drawing Sheets

(56) References Cited

U.S. PATENT DOCUMENTS

2013/0074109 A1* 3/2013 Skelton .................. H04H 20/00
 725/14
2013/0081084 A1* 3/2013 Scheer ............... H04N 21/2408
 725/46
2013/0117773 A1* 5/2013 Davies ................. H04N 21/252
 725/14
2013/0291019 A1* 10/2013 Burkitt ............... H04N 21/4828
 725/53
2014/0095999 A1* 4/2014 Lehto ................. H04N 21/4751
 715/716

* cited by examiner

SYSTEM AND METHOD FOR RECOMMENDING ON DEMAND MULTIMEDIA CONTENT BASED ON EVENT INFORMATION

CROSS-REFERENCE TO RELATED APPLICATIONS

This application claims priority to Indian patent application no. 336/CHE/2013 filed on Jan. 24, 2013, the complete disclosure of which, in its entirely, is herein incorporated by reference.

BACKGROUND

1. Technical Field

The embodiments herein generally relate to recommending multimedia content, and, more particularly, to recommending multimedia content in the context of video on demand based on event information.

2. Description of the Related Art

Television (TV) shows and/ movies are aired at specific time slots only. Hence, a show has to be watched by a user at the specific time when it is aired. Earlier, if a user missed a show aired on TV, there was no other source to watch it. But slowly a transition is taking place where premium content (e.g., videos of TV shows and movies) is available online through on-demand internet streaming service providers such as Netflix and Hulu. The premium content can also include e-books, articles or multimedia content that is offered to readers on a subscription basis. The World Wide Web (WWW) includes millions of videos, pictures etc. that are available to users on demand. According to a finding, about sixty percent of data consumed on the internet is on-demand multimedia content.

Users may find the multimedia content that they are interested in, in a chance encounter or upon rigorously searching the web for the intended premium multimedia content. In this age of information overload, there exists a situation where a lot of premium multimedia content is available online which can be watched by the user. Hence, it has become increasingly difficult for the user to decide or prioritize which premium video to watch at a particular time. Accordingly, there remains a need for a system which helps a user to prioritize the premium multimedia content that is available online and likely to be of interest to the user.

SUMMARY

In view of the foregoing, an embodiment herein provides a method for recommending premium on-demand multimedia content based on event information. The method includes (i) obtaining the event information associated with a time period, (ii) mapping the event information with structured metadata associated with a plurality of premium on-demand multimedia content, and (iii) generating a recommendation for at least one matching premium on-demand multimedia content based on the event information and a structured metadata associated with the at least one matching premium on-demand multimedia content. The time period includes a current time during which an event is trending. A metadata associated with at least one premium multimedia content corresponds to the event information.

The event information may include information corresponds to one or more (a) an award, (b) a sequel of a movie, (c) a new season of a show, and (d) a celebrity. The structured metadata associated with celebrity may include (a) a name/title, (b) personal description, (c) filmography, (e) birthdate, (f) birthplace, (g) awards & nominations, and a (h) a biography. The structured metadata associated with movie may include (a) a name/title, (b) running time associated with a movie, (c) a genre, (d) a sequel of a movie, (e) a language, (f) awards & nominations, (g) release date associated with a movie, and (i) rating associated with movie. The structured metadata associated with television show episodes may include (a) a name/title, (b) running time associated with an episode, (c) a genre, (d) season, (e) a language, (f) awards & nominations, (g) description, and (i) parental guidance rating. The method further include assigning a priority score, by a priority computing module, to at least one premium on-demand multimedia content based on at least one parameter. The one or more parameter may include (i) a popularity associated with an event, and (ii) popularity associated with a multimedia content.

In another aspect, a system for recommending premium on-demand multimedia content based on event information is provided. The system include (i) a memory unit that stores (a) a set of modules, and (b) a database; and (ii) a processor that executes the set of modules. The set of modules include (a) an event information identification module, executed by the processor, that obtains the event information associated with a time period, (b) an event information mapping module, executed by the processor, that maps the event information with the structured metadata associated with the plurality of premium on-demand multimedia content, and (c) a multimedia content recommendation module, executed by the processor, that generates a recommendation for at least one matching premium on-demand multimedia content based on the event information and a structured metadata associated with the at least one matching premium on-demand multimedia content. The database includes one or more (i) the event information, and (ii) information corresponds to structured metadata associated with a plurality of premium on-demand multimedia content. The time period include a current time during which an event is trending. A metadata associated with at least one premium multimedia content corresponds to the event information.

The event information may include information corresponds to at least one of (a) an award, (b) a sequel of a movie, (c) a new season of a show, and (d) a celebrity. The structured metadata associated with celebrity may include (a) a name/title, (b) personal description, (c) filmography, (e) birthdate, (f) birthplace, (g) awards & nominations, and a (h) a biography. The structured metadata associated with movie may include (a) a name/title, (b) running time associated with a movie, (c) a genre, (d) a sequel of a movie, (e) a language, (f) awards & nominations, (g) release date associated with a movie, and (i) rating associated with movie. The structured metadata associated with television show episodes may include (a) a name/title, (b) running time associated with a episode, (c) a genre, (d) season, (e) a language, (f) awards & nominations, (g) description, and (i) parental guidance rating. The system may further include a priority computing module that assigns a priority score to at least one premium on-demand multimedia content based on at least one parameter. The one or more parameter may include (i) a popularity associated with an event, and (ii) popularity associated with a multimedia content.

In yet another aspect, a computing device to receive a recommendation of a premium on-demand multimedia content based on event information is provided. The computing device includes (i) a display unit; and (ii) a processor. The computing device is configured to receive one or more premium on-demand multimedia content from a multimedia content recommendation server. The multimedia content recommendation server (a) receives the event information associated with a time period, (b) maps the event information with structured metadata associated with a plurality of premium on-demand multimedia content, and (c) generating an recommendation for at least one matching premium on-demand multimedia content based on the event information and a structured metadata associated with the at least one matching premium on-demand multimedia content. The one or more matching premium on-demand multimedia content is displayed at the display unit of the computing device. The time period include a current time during which an event is trending. A metadata associated with at least one premium on-demand multimedia content corresponds to the event information. The event information may include information corresponds to one or more (a) an award, (b) a sequel of a movie, (c) a new season of a show, and (d) a celebrity.

In further aspect, a multimedia content recommendation server for recommending premium on-demand multimedia content based on event information is provided. The multimedia content recommendation server includes a database. The database includes one or more (i) the event information, and (ii) information corresponds to structured metadata associated with a plurality of premium on-demand multimedia content. The event information includes information corresponds to at least one of (a) an award, (b) a sequel of a movie, (c) a new season of a show, and (d) a celebrity. The multimedia content recommendation server (i) obtains, from the database, the event information associated with a time period, (ii) maps the event information with structured metadata associated with a plurality of premium on-demand multimedia content, and (iii) generates a recommendation for at least one matching premium on-demand multimedia content based on the event information and a structured metadata associated with the at least one matching premium on-demand multimedia content. The time period includes a current time during which an event is trending. A metadata associated with at least one premium multimedia content corresponds to the event information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system which helps a user to prioritize the premium multimedia content that is available online and likely to be of interest to the user. The embodiments herein achieve this by providing a multimedia content recommending system that generates a recommendation for one or more premium multimedia content (e.g., video available on demand (VOD)) to a user by mapping event information (associated with one or more entities) to the structured metadata of premium content. Referring now to the drawings, and more particularly to FIGS. 1 through 7, where similar reference characters denote corresponding features consistently throughout the figures, there are shown preferred embodiments are described herein.

Figure 1:
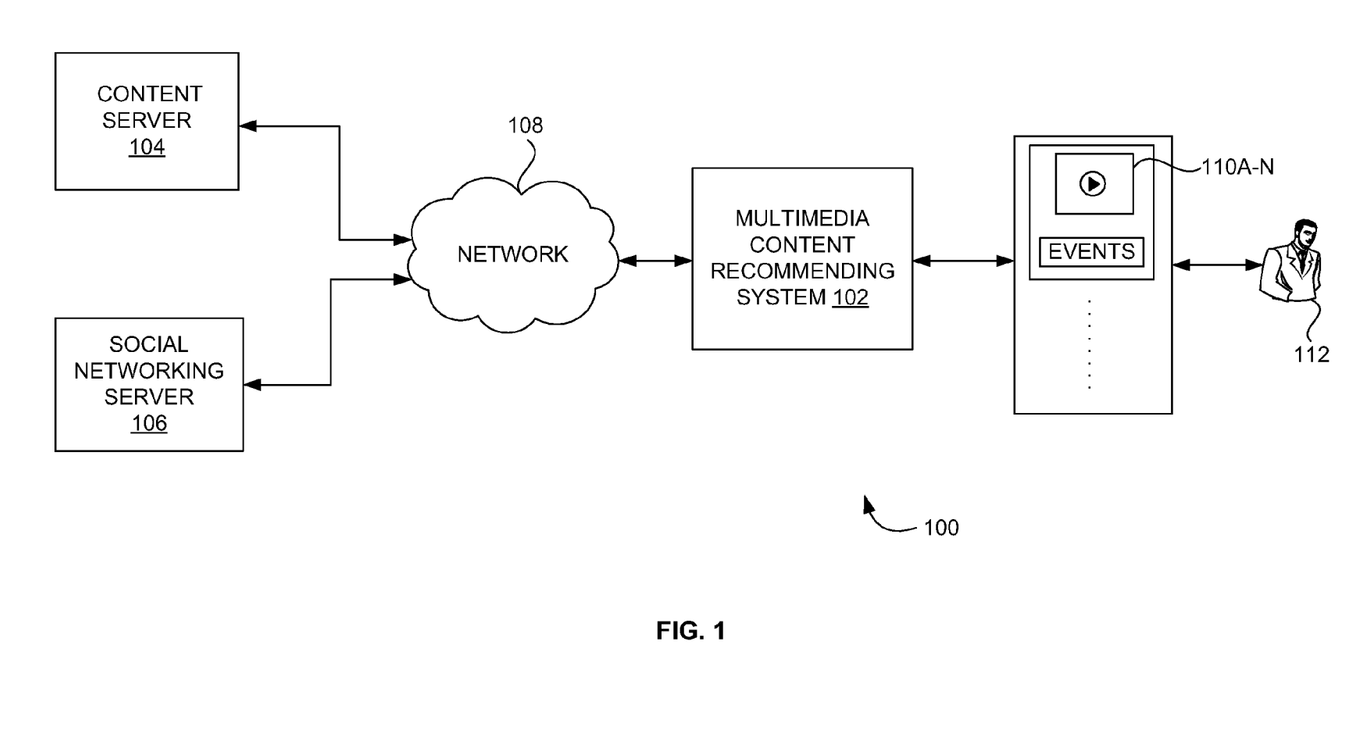
FIG. 1 illustrates a system view of a multimedia content recommendation system communicating with a content server and a social networking server to generate a recommendation for premium on-demand multimedia content according to an embodiment herein.

FIG. 1 illustrates a system view 100 of a multimedia content recommendation system 104 communicating with a content server 106 and a social networking server 108 to generate a recommendation for premium on-demand multimedia content according to an embodiment herein. The system view 100 includes the multimedia content recommending system 102, the content server 104, the social networking server 106, a network 108, one or more matching premium on-demand multimedia content 110A-N, and a user 112. The multimedia content recommending system 102 recommends one or more matching premium on-demand multimedia content (e.g. videos available on demand (VOD)) 110A-N to the user 112. Event information (e.g., an activity or action occurring around one or more entities) are detected.

In one embodiment, the event information is detected based on online real time content. The event information is associated with a time period, in one embodiment. The time period may include an event (e.g., a celebrity associated with a famous movie sequel got expired) is trending at present. In another embodiment, an event may be trending for a day and/or one or more weeks. The event information is mapped with structured metadata associated with a plurality of premium on-demand multimedia content. In one embodiment, a metadata associated with one or more premium multimedia content corresponds to the event information. A recommendation of one or more matching premium on-demand multimedia content 110A-N is generated based on the event information and a structured metadata associated with the one or more matching premium on-demand multimedia content 110A-N. The one or more entities may be television shows, movies, videos available on demand (VOD). The multimedia content recommending system 102 may be implemented in a computing device.

In one embodiment, the computing device is a personal computer, a smart phone, a laptop, a tablet PC, a smart device, and/or an ultra-book, etc. In one embodiment, the multimedia content recommending system 102 is implemented in a set-up box and displayed on a television (TV). The multimedia content recommending system 102 collects the data from the content server 104 and the social networking server 106 through the network 108 and recommends the one or more matching premium on-demand multimedia content 110A-N that are of interest to the user 112. In one embodiment, the network 110 may be an internet, or a broadcast network, or a wireless network. For example, the content server 104 receives content available online, television shows, movies, events, from different sources (e.g., YouTube©, CNN©, etc). In another example, the content server 104 receives content from cable operators and satellite providers. In one embodiment, the social networking server 106 receives information from social networking sites such as Facebook©, twitter©, LinkedIn©, etc.

Figure 2:
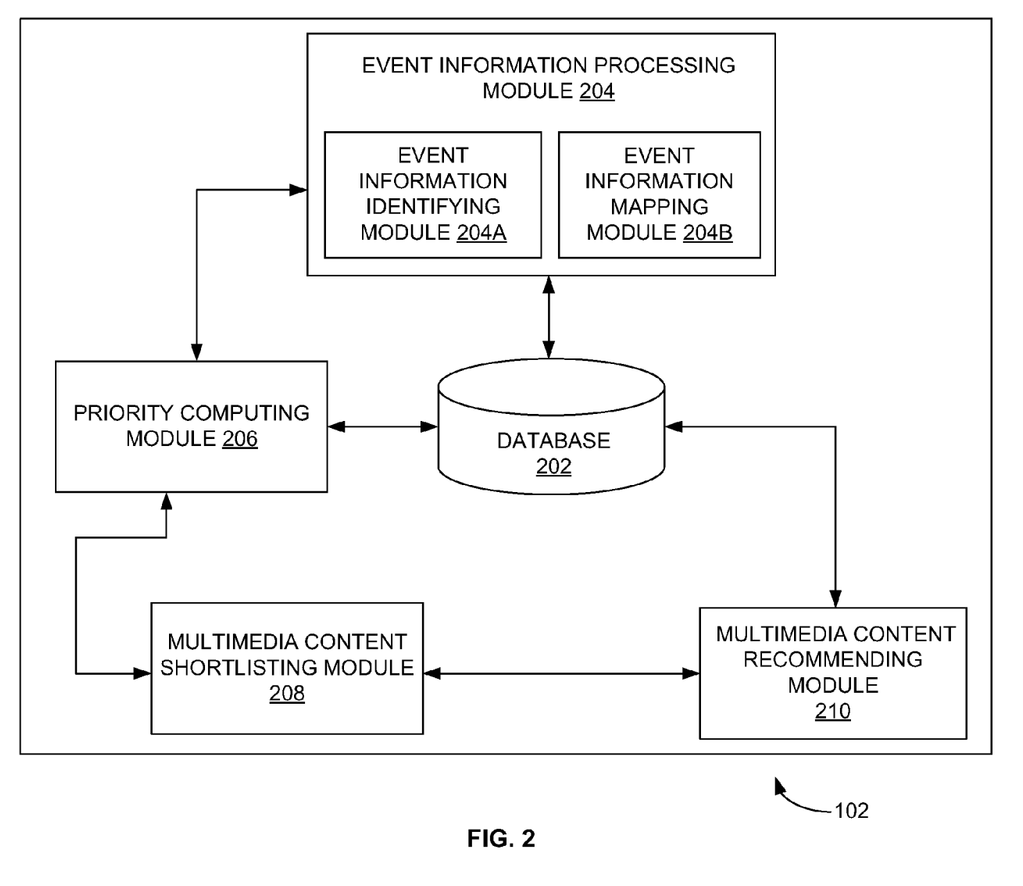
FIG. 2 illustrates a exploded view of the multimedia content recommendation system of FIG. 1 according to an embodiment herein.

FIG. 2 illustrates an exploded view of the multimedia content recommendation system 102 of FIG. 1 according to an embodiment herein. The multimedia content recommendation system 102 includes a database 202, event information processing module 204, a priority computing module 206, a multimedia content shortlisting module 208, and a multimedia content recommendation module 210. The database 202 stores (i) event information associated with one or more entities (ii) information associated with one or more entities, (iii) metadata associated with one or more premium multimedia content. In one embodiment, the metadata associated one or more entities (e.g. television shows, movies, videos available on demand (VOD)) are in structured format.

For example, metadata associated with television shows are (i) name/title, (ii) description, (iii) genres, (iv) subjects (sub genres), (v) languages, (vi) locations, (vii) PG rating, (viii) cast & crew, and (ix) awards & nominations. In another example, metadata associated with television shows episodes are (i) title, (ii) description, (iii) season, (iv) episode, (v) season title, (vi) television Show title, (vii) episode running time, (viii) PG rating, (ix) Broadcasting date, and (x) Cast & crew. Similarly, metadata associated with movies are (a) Name/Title, (b) Description, (c) Release date, (d) Running time, (e) Genres, (f) Subjects (Sub genres), (g) Languages, (h) Locations, (i) Prequels of a movie, (j) Sequels of a movie, (k) PG Rating, (l) production companies, (m) Cast & crew, and (n) Awards & Nominations. In yet another example, metadata associated with a celebrity are (i) Name, (ii) biography, (iii) birthdate, (iv) Birthplace, (v) filmography, (vi) Awards & nominations, and (vii) Personal details.

The event information processing module 204 further include an event information identification module 204A and an event information mapping module 204B. The event information identification module 204A identifies the event information associated with a time period. The time period may include a current time during which an event (e.g., a celebrity associated with a famous movie sequel got expired) is trending at present. In another embodiment, an event may be trending for a day and/or one or more weeks. In one embodiment, the events information associated with one or more entities are dynamically monitored. For example, the event information associated with one or more entities are (i) a movie/television show wins an award or is nominated for an award, (ii) a celebrity (actor, director, producer) wins an award, (iii) a celebrity expires, (iv) a sequel of a famous movie to be released, (v) an all new season of a popular television show to be released, and (vi) a celebrity gets embroiled in a controversy. The event information mapping module 204B maps the event information with the structured metadata associated with the plurality of premium on-demand multimedia content to obtain one or more premium on-demand multimedia content 110A-N. A metadata associated with one or more premium multimedia content corresponds to the event information.

The priority computing module 206 assigns a priority score to each of the one or more premium on-demand multimedia content based on one or more parameters (e.g., popularity associated with an event, popularity associated with multimedia content) once the event information is mapped with the plurality of premium on-demand multimedia content. The multimedia content shortlisting module 208 shortlists one or more premium on-demand multimedia content based on the priority scores assigned in the priority computing module 206. In one embodiment, the multimedia content shortlisting module 206 may shortlist the multimedia content by assigned ranks based on one or more algorithms.

In one example, while assigning ranks to the multimedia content one or more parameters are considered (i) activities of the user's friends, influencers and other connections on social medium, (ii) one or more topics related to event[s] that are trending on the social medium, (iii) one or more topics related to event[s] that are popular on the social medium, (iv) popularity of a multimedia content, (v) trendiness of the multimedia content. The one or more parameters may be considered with different weightages while assigning ranks to the multimedia content. The multimedia content recommendation module 210 generates a recommendation for at least one matching premium on-demand multimedia content 110A-N based on the event information and a structured metadata associated with the at least one matching premium on-demand multimedia content. The at least one matching premium on-demand multimedia content 110A-N may be displayed to the user along with reason/events (e.g., reason/events for recommending the multimedia content to watch now).

For example, a "Lord of the Rings" movie won an award hence the movie can be recommended to the user 112. In another example, when a celebrity cast in "Harry Potter" movie wins an award, then the movie/television show for which the celebrity won the award can be recommended. Similarly other popular movies/shows which the celebrity is associated with may also be recommended. In yet another example, when a sequel of a famous movie franchise is coming up (e.g., "Dark Knight Rises"), then previous movie series can be recommended (e.g., 'The Batman').

In yet another example, when an all new season of a popular television show is coming up, then previous seasons of the show can be recommended. For example, new series of "Big Bang Theory" show are released hence the old series related with the show are pushed to the user 112. In yet another example, when a celebrity's birthday is coming up, then popular movies/shows of the celebrity can be recommended. In yet another example, when a celebrity gets embroiled in a controversy, then movies/shows with which the celebrity was associated can be recommended.

Figure 3:
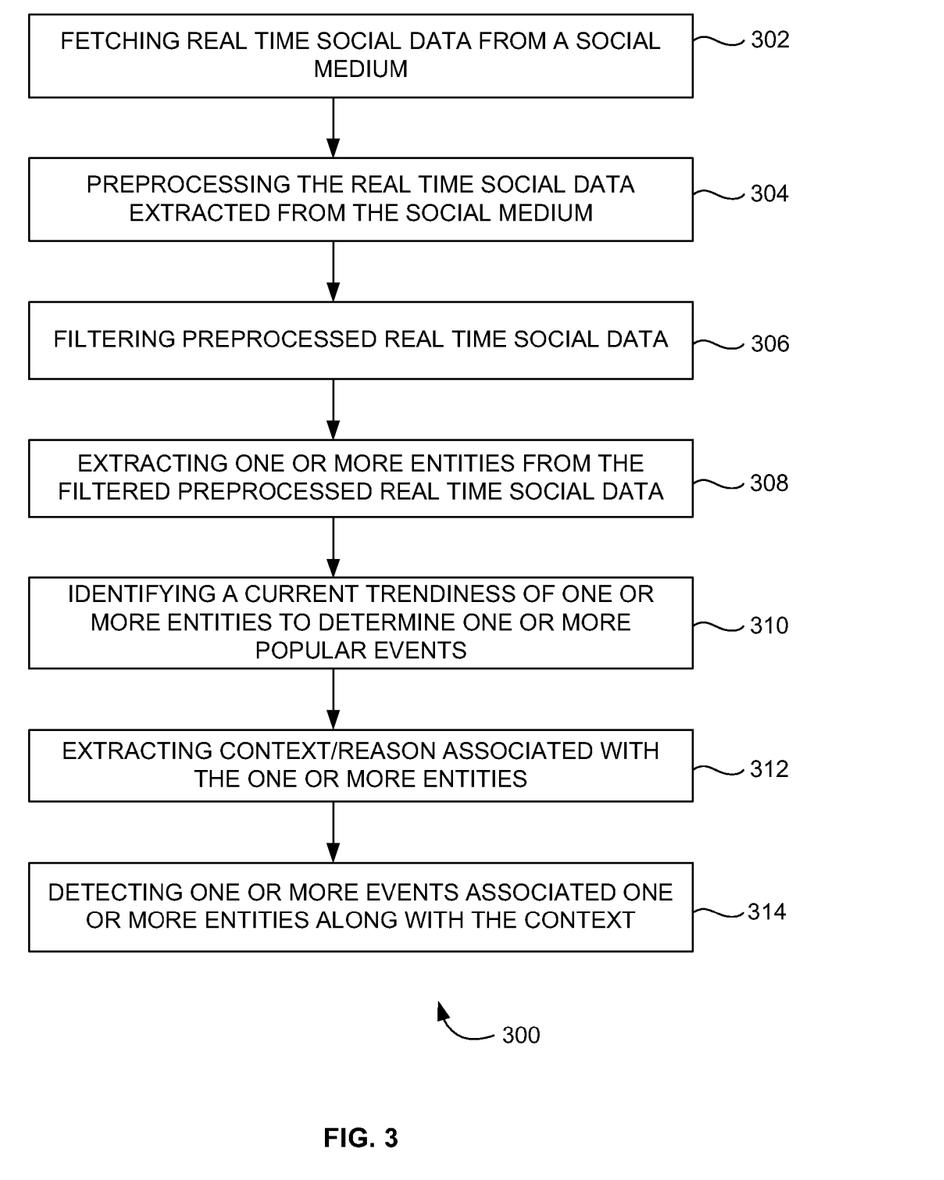
FIG. 3 is a flow diagram illustrating a method of detecting one or more events associated with one or more entities according to an embodiment herein.

FIG. 3 is a flow diagram 300 illustrating a method of detecting one or more events associated with one or more entities according to an embodiment herein. In step 302, real time social data is fetched from the social medium. In one embodiment, the real time social data is fetched from sources (e.g., social networking sites). The real time social data may be in the form of microblogs or posts. In step 304, the real time social data extracted from the social medium is preprocessed to remove unwanted information, fields and normalized to a common format. In step 306, preprocessed real time social data is filtered. In one embodiment, the data which is extracted from the preliminary steps are diversified and relates to various other topics. Hence a topic model may be built which classify one or more incoming posts into various topics.

The topic model may support to classify and filter the real time social data. In step 308, one or more entities are extracted from the filtered preprocessed real time social data. In step 310, a current trendiness of one or more entities identified to determine one or more popular events. In one embodiment, entities which occur higher than a predefined threshold are added to a new event. In step 312, context/reason associated with the one or more entities is extracted. For example, most co-occurring words are extracted with the entity in the microblogs or posts associated the social stream data. In step 314, one or more events associated one or more entities along with the context are detected. For ex, "Daniel Lewis" is an entity which found trending in real time social data and "Oscar best actor" is the context extracted for the entity.

Figure 4A:
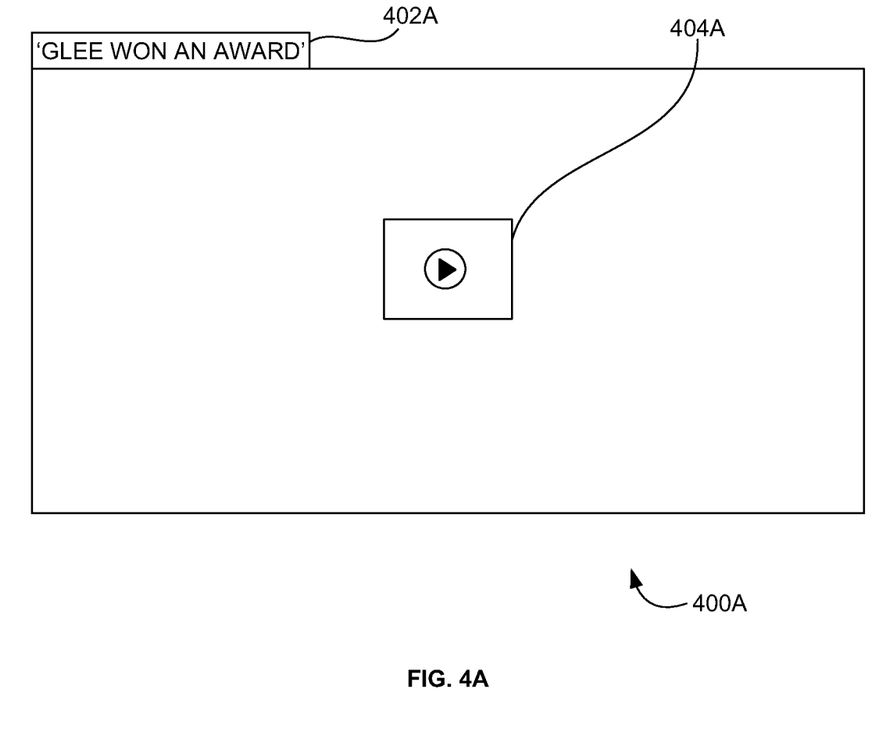
FIGS. 4A, 4B & 4C illustrates a user interface view of displaying a list of recommended on-demand multimedia content to the user by multimedia content recommending system of FIG. 1 according to the embodiment herein.

FIG. 4A illustrates a user interface view of displaying a list of recommended on-demand multimedia content to the user 112 by multimedia content recommending system 102 of FIG. 1 according to the embodiment herein. The user interface view includes a reason/event field 402A, and a multimedia content field 404A. The reason field 402A displays the reason/event why particular videos are recommended to the user 112. For example, the multimedia content field 404A displays a video which is recommended to the user 112. The reason field 402A displays the reason/event associated with the video for recommending may be 'Glee won an award'.

Figure 4B:
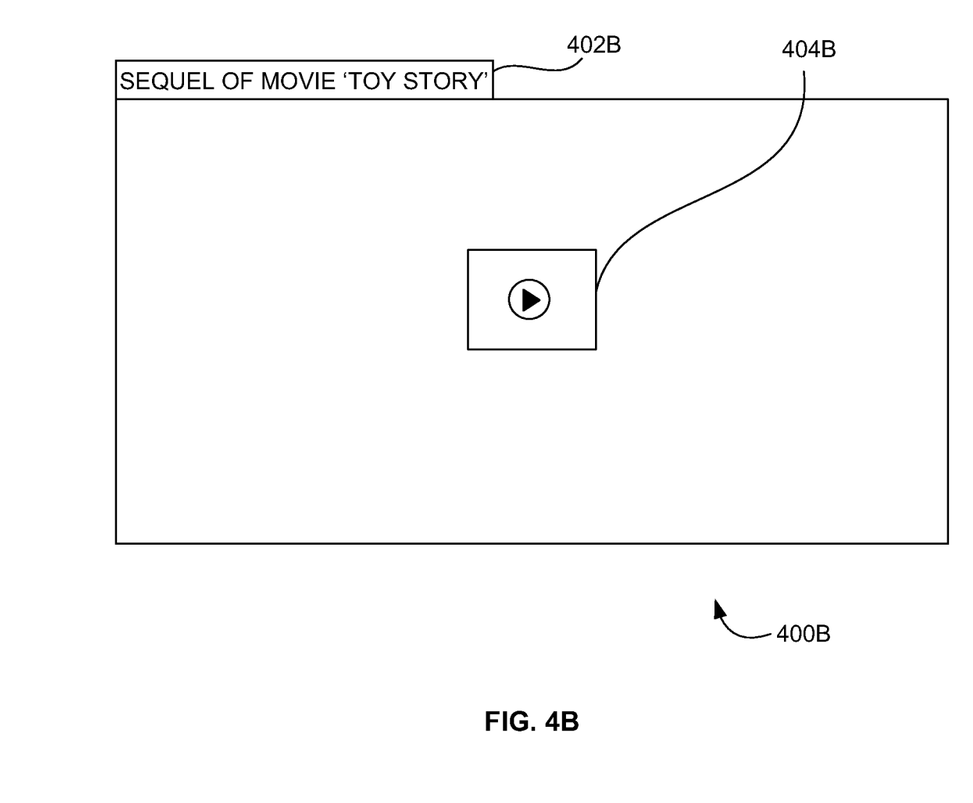

FIG. 4B illustrates a user interface view of displaying a list of recommended on-demand multimedia content to the user 112 by multimedia content recommending system 102 of FIG. 1 according to the embodiment herein. For example, the multimedia content field 404B displays a video which is recommended to the user 112 with the reason/event. The reason field 402B displays reason/event associated with the video for recommending may be 'Sequel of movie TOY STORY is coming up'.

Figure 4C:
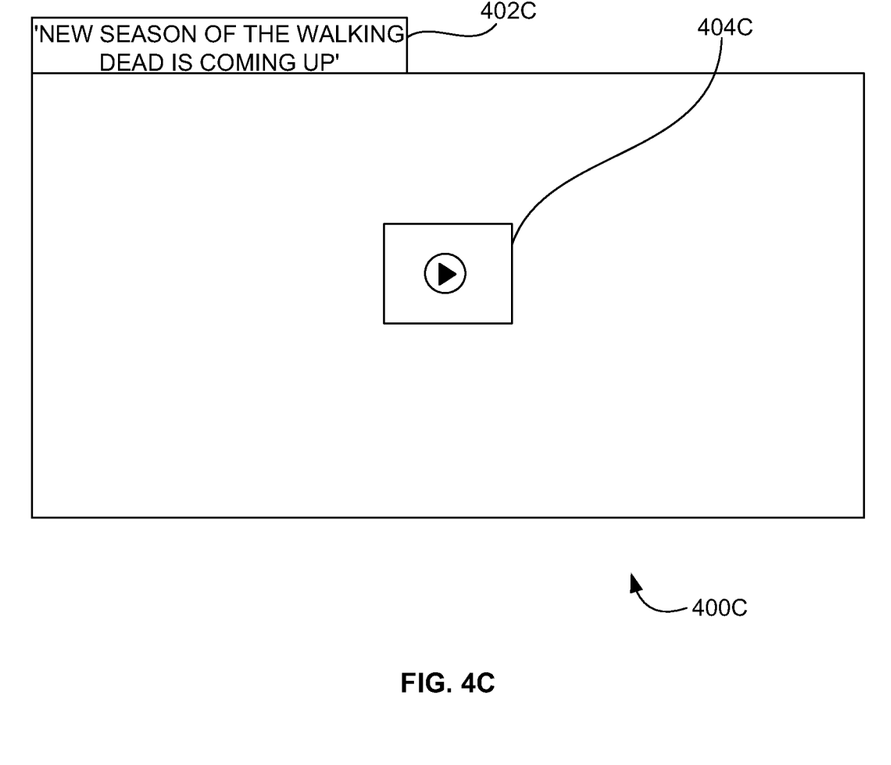

FIG. 4C illustrates a user interface view of displaying a list of recommended on-demand multimedia content to the user 112 by multimedia content recommending system 102 of FIG. 1 according to the embodiment herein. For example, the multimedia content field 404C displays a video which is recommended to the user 112 with the reason/event. The reason field 402C displays reason/event associated with the video for recommending may be 'new season of the Walking Dead is coming up'.

Figure 5:
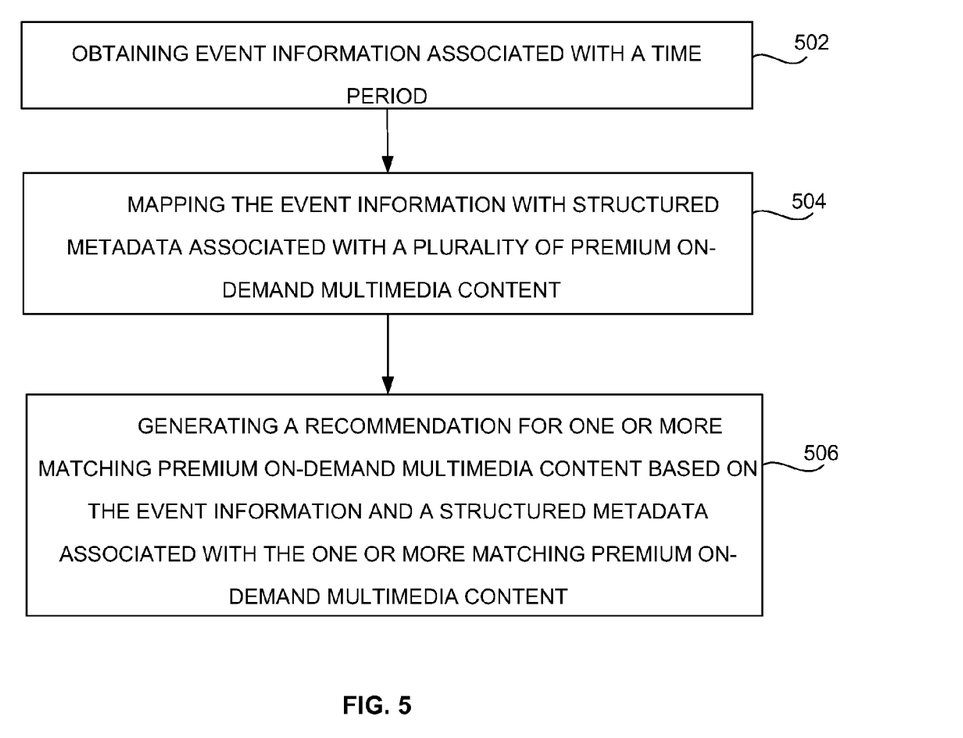
FIG. 5 is a flow diagram illustrating a method of recommending premium on-demand multimedia content based on event information according to the embodiment herein.

FIG. 5 is a flow diagram illustrating a method of recommending premium on-demand multimedia content based on event information according to the embodiment herein. In step 502, event information associated with a time period is obtained. The time period includes a current time during which an event is trending. In step 504, the event information is mapped with structured metadata associated with a plurality of premium on-demand multimedia content. A metadata associated with at least one premium multimedia content corresponds to the event information. In step 506, a recommendation for one or more matching premium on-demand multimedia content is generated based on the event information and a structured metadata associated with the one or more matching premium on-demand multimedia content.

The event information may include information corresponds to at least one of (a) an award, (b) a sequel of a movie, (c) a new season of a show, and (d) a celebrity. The structured metadata associated with celebrity may include (a) a name/title, (b) personal description, (c) filmography, (e) birthdate, (f) birthplace, (g) awards & nominations, and a (h) a biography. The structured metadata associated with movie may include (a) a name/title, (b) running time associated with a movie, (c) a genre, (d) a sequel of a movie, (e) a language, (f) awards & nominations, (g) release date associated with a movie, and (i) rating associated with movie. The structured metadata associated with television show episodes may include (a) a name/title, (b) running time associated with an episode, (c) a genre, (d) season, (e) a language, (f) awards & nominations, (g) description, and (i) parental guidance rating. The method may further include a priority score may be assigned by a priority computing module to one or more premium on-demand multimedia content based on at least one parameter. The one or more parameter may include (i) a popularity associated with an event, and (ii) popularity associated with a multimedia content.

Figure 6:
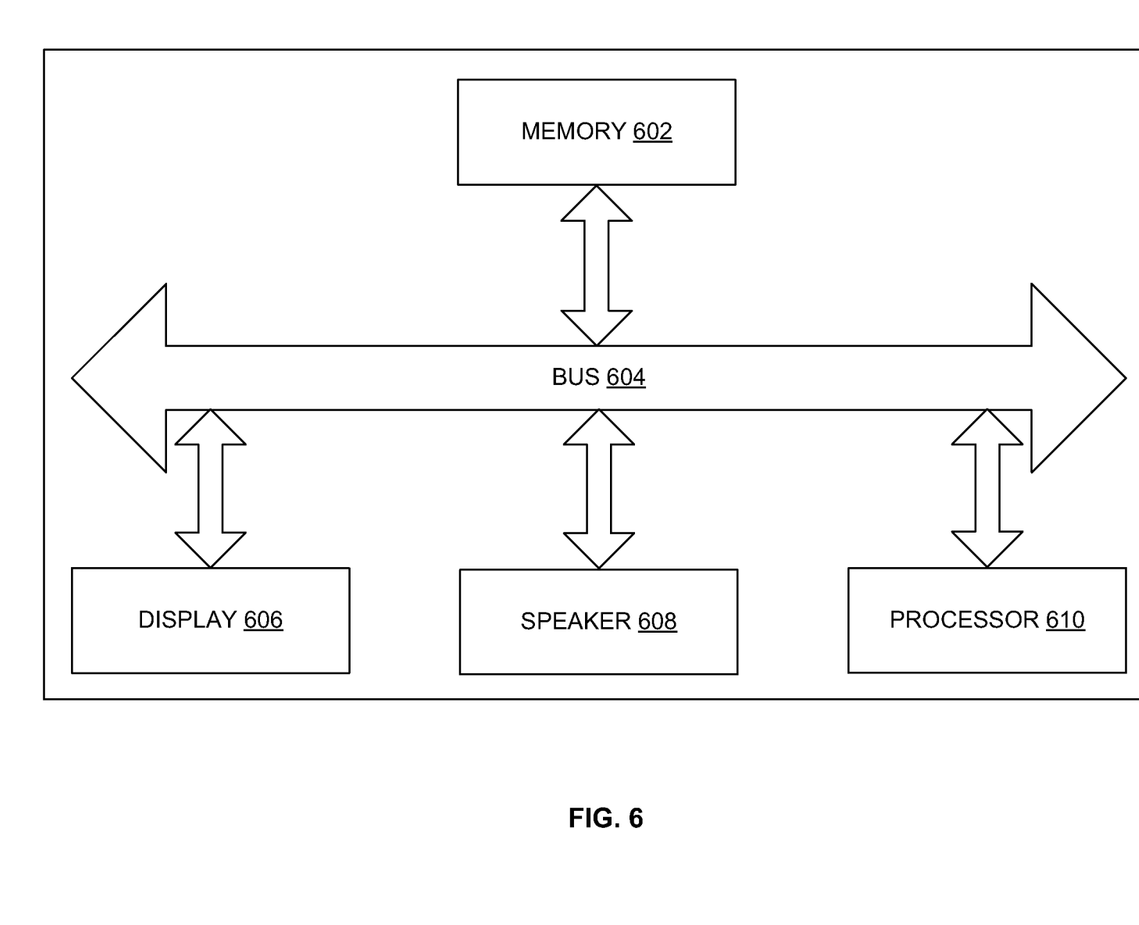
FIG. 6 illustrates an exploded view of the computing device of FIG. 1 according to an embodiments herein.

FIG. 6 illustrates an exploded view of the computing device (Not shown in Figure) of FIG. 1 having an memory 602 having a set of instructions, a bus 604, a display 606, a speaker 608, and a processor 610 capable of processing the set of instructions to perform any one or more of the methodologies herein, according to an embodiment herein.

The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program specific information and/or service information (PSI/SI), including information about digital content (e.g., the detected information bits) available in the future or stored from the past. A user of the computing device may view this stored information on the display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the computing device using the bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections).

In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
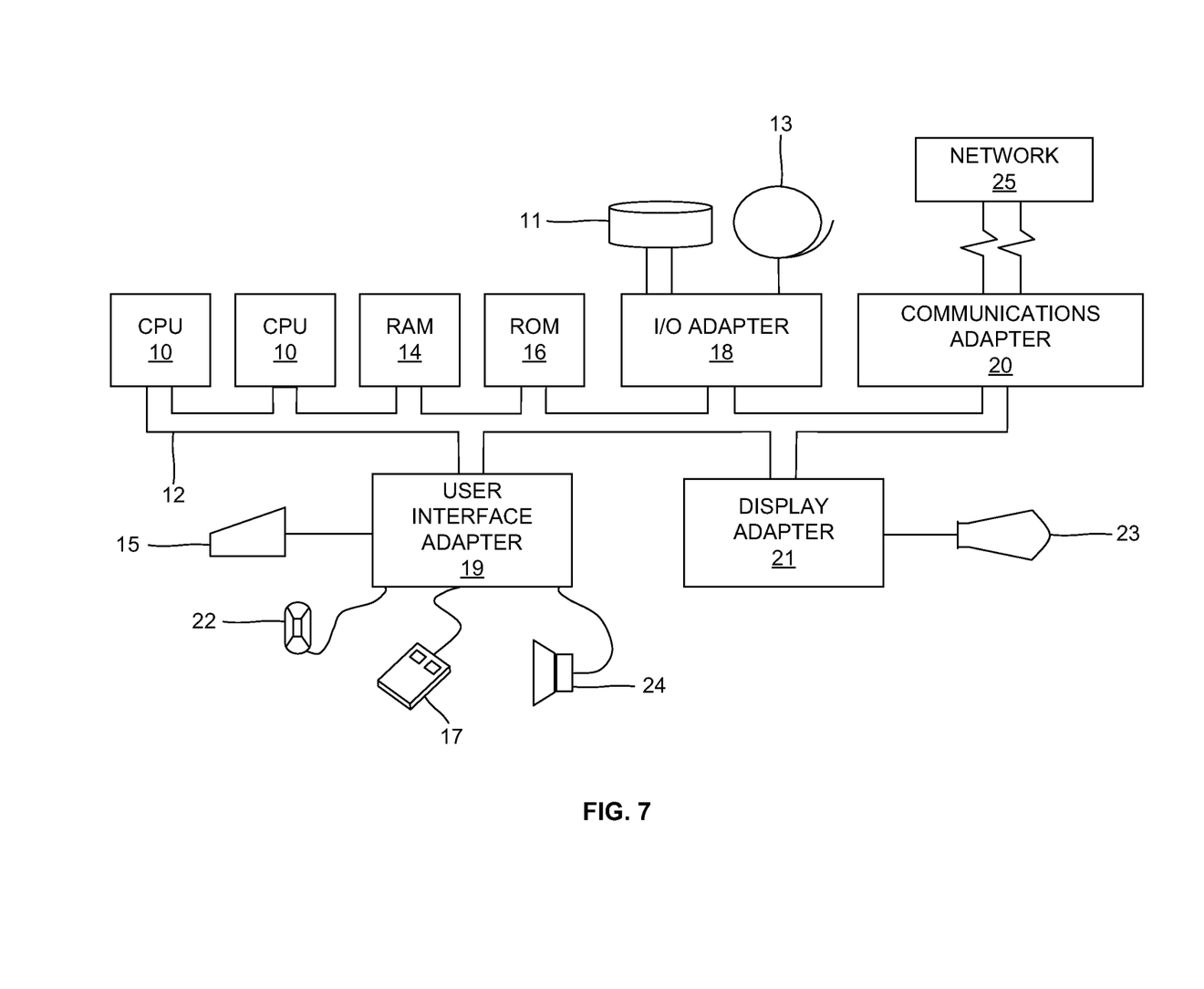
FIG. 7 illustrates a schematic diagram of a computer architecture used in accordance with the embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The multimedia content recommendation system 102 collects the information associated with list of shows/movies from different sources, filters and recommends them according to interest of the user 112. The mapping of the event information (related to movies/shows/celebs) to the structured metadata of premium content to create triggers which can be used to help the user 112 to know why the shows/movies have been recommended to make it more interesting to watch that show/movie now rather than watching it later in the context of 'Video on Demand'.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for recommending premium on-demand multimedia content to a user based on event information, said method comprising:

obtaining said event information associated with a time period via an event information identification module, wherein said time period comprises a current time during which an event is trending;

mapping said event in formation with structured metadata associated with a plurality of premium on-demand multimedia content, using an event information mapping module, wherein data associated with at least one of said plurality of premium on-demand multimedia content corresponds to said event information; and assigning a priority score, using a priority computing module, to the at least one of said plurality of premium on-demand multimedia content based on at least one parameter, wherein said at least one parameter comprises (i)activities of the user's friends influencers and connections on a social medium, (ii) at least one topic related to event trending on the social medium, (iii) at least one topic related to event popular on the social medium, (iv) popularity of the at least one of said plurality of premium on-demand multimedia content, (v) trendiness of the at least one of said plurality of premium on-demand multimedia content;

shortlisting the at least one of said plurality of premium on-demand multimedia content with a multimedia content shortlisting module based on the priority scores or a rank assigned, and wherein the rank is assigned to the at least one of said plurality of premium on-demand multimedia content based on one or more algorithms, and wherein one or more of said at least one parameters are considered while assigning the ranks and wherein the one or more of said at least one parameters are assigned with different weights while assigning ranks to the at least one of said plurality of premium on-demand multimedia content;

generating, using a multimedia content recommendation module, a recommendation for the at least one of said plurality of premium on-demand multimedia content based on said event information, said priority score and said structured metadata associated with said at least one of said plurality of premium on-demand multimedia content; and wherein said event information comprises information corresponding to at least one of (a) an award, (b) a sequel of a movie, (c) a new season of a show, and (d) a celebrity, wherein said structured metadata includes metadata associated with a celebrity, wherein said metadata associated with a celebrity comprises (a) a name/title, (b) personal description, (c) filmography, (d) birthdate, (e) birthplace, (f) awards & nominations, and a (g) a biography, and wherein said structured metadata includes metadata associated with movies, wherein said metadata associated with movies comprises (a) a name/title, (b) running time associated with a movie, (c) a genre, (d) a sequel of a movie, (e) a language, (f) awards & nominations, (g) release date associated with a movie, and (h) rating associated with movie, wherein said structured metadata includes metadata associated with television show episodes, wherein said metadata associated with television show episodes comprises (a) a name/title (b) running time associated with an episode (c) a genre, (d) season, (e) a language, (f) awards & nominations, (g) description, and (i) parental guidance rating; and selectively displaying the recommendation for the at least one of said plurality of premium on-demand multimedia content to the user via a display unit, along with a reason for generating the recommendation, said reason indicating why the at least one of said plurality of premium on-demand multimedia content is recommend to watch now rather than later.

2. A system for recommending premium on-demand multimedia content to a user, based on event information, the system comprising a hardware processor, said system further comprising;

a memory unit having stored thereon a database, wherein said database comprises at least one of (i) said event information, and (ii) information corresponding to structured metadata associated with a plurality of premium on-demand multimedia content;

an event information processing circuit comprising an event information identification circuit and an event information mapping circuit, and wherein the event information identification circuit is configured to obtain said event information associated with a time period, wherein said time period comprises a current time during which an event is trending, and wherein the event information mapping circuit is configured to map said event information with said structured metadata associated with said plurality of premium on-demand multimedia content, wherein data associated with at least one of said plurality of premium on-demand multimedia content corresponds to said event information, wherein said event information comprises information corresponding to at least of (a) an award (b) a sequel of a movie, (c) a new season of a show, and (d) a celebrity;

a multimedia content shortlisting circuit configured for shortlisting at least one of said plurality of premium on-demand multimedia content based on a priority score or an assigned rank, and wherein the rank is assigned to the at least one of said plurality of premium on-demand multimedia content based on one or more algorithms, and wherein one or more parameters are considered while assigning the rank, and wherein the one or more parameters are assigned with different weights while assigning the rank to the at least one of said plurality of premium on-demand media content;

a priority computing circuit configured to assign the priority score to the at least one of said plurality of premium on-demand multimedia content based on at least one of said parameters, wherein said at least one of said parameters includes at least one of activities of the user's friends, influencers and connections on social medium, at least one topic related to an event that is trending on the social medium, at least one topic related to an event that is popular on the social medium, a popularity of the at least one of said plurality of premium on-demand multimedia content, and trendiness of the at least one of said plurality of premium on-demand multimedia content;

a multimedia content recommendation circuit, configured to generate a recommendation for at least one matching premium on-demand multimedia content based on said event information and said structured metadata associated with said at least one matching premium on-demand multimedia content and wherein said structured metadata includes metadata associated with a celebrity, wherein said metadata associated with a celebrity comprises (a) a name/title (b) personal description (c) filmography, (e) birthdate, (f) birthplace, (g) awards & nominations, and a (h) a biography, wherein said structured metadata further includes metadata associated with movies, wherein said metadata associated with movies comprises (a) a name/title, (b) running time associated with a movie, (c) a genre, (d) a sequel of a movie, (e) a language, (f) awards & nominations, (g) release date associated with a movie, and (h) rating associated with movie, wherein said structured metadata further includes metadata associated with television show episodes, wherein said metadata associated with television show episodes comprises (a) a name/title, (b) running time associated with an episode (c) a genre, (d) season, (e) a language, (f) awards & nominations, (g) description, and (h) parental guidance rating; and a display unit configured to display the recommendation for said matching premium on demand multimedia content to the user along with a reason for generating the recommendation, said reason indicating why the at least one of said plurality of premium on-demand multimedia content is recommended to watch now rather than later;

wherein the computing device is selected from a group consisting of a personal computer, a smartphone, a laptop, a tablet PC, a smart device, an ultra-book, and a set top box.

3. The system of claim 2, wherein said at least one of said parameters further comprises a popularity associated with an event.

\* \* \* \* \*